Oct. 27, 1936.  W. HOLSTEN ET AL  2,058,691

TRAILER APPARATUS

Filed July 5, 1934

INVENTORS
Walter Holsten
Herman Tonn
BY
Quarles & French
ATTORNEYS

Patented Oct. 27, 1936

2,058,691

UNITED STATES PATENT OFFICE 2,058,691

TRAILER APPARATUS

Walter Holsten and Herman Tonn, Lake Mills, Wis.

Application July 5, 1934, Serial No. 733,817

3 Claims. (Cl. 280—61)

The invention relates to trailer apparatus.

There are many types of wheeled vehicles, such as certain agricultural implements or devices that are not adapted to be pulled rapidly along the highway as by a motor driven vehicle. The object of the present invention is to provide trailer apparatus for such wheeled vehicles whereby the vehicle is mounted on a set of rubber tired wheels which may be readily attached to wheels of said vehicle.

A further object of the invention is to provide a trailer wheel attachment in which the axle for said wheel is carried by a cradle which receives the vehicle wheel.

The invention further consists in the several features hereinafter set forth and more particularly defined by claims at the conclusion hereof.

Figure 1:
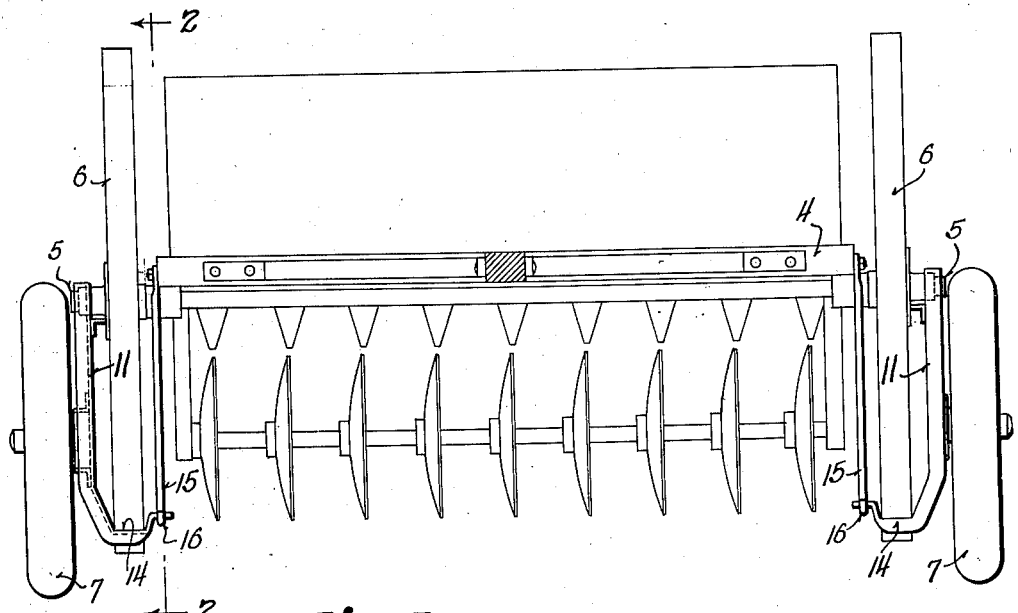
Fig. 1 is a front elevational view of trailer apparatus embodying the invention applied to an agricultural implement.

Referring to the drawing, the numeral 3 designates generally an agricultural implement here shown more particularly as a pea drill and having the frame 4, axles 5, and wheels 6 mounted on said axles.

The trailer apparatus embodying the invention includes a trailer wheel device for each of the vehicle wheels 6 so as to support the same above the roadway.

Each trailer wheel device includes a wheel 7 having a rubber or pneumatic tire 8 mounted thereon, said wheel being journalled on an axle 9 carried by a frame or cradle 10 which carries the vehicle wheel 6.

The cradle 10 is preferably made of standard steel sections and includes the two channel frame members 11 and the cross frame angle members 12 and 13 riveted thereto. The base of the axle 9 is secured to the members 13. The axle 5 of the wheel 6 is adapted to fit in the space between the upper end of the frame members 11 and the member 12 and the lower ends 14 of the members 11 are hooked or bent to form wheel receiving portions, said members 11 being radially spaced apart.

The cradle 10 is adapted to be secured to the vehicle by a tie-rod 15 which is pivotally connected at one end 16 to one of the frame members 11 and is adapted to be detachably connected at its other end to the frame 4 as by a bolt 17.

Figure 2:
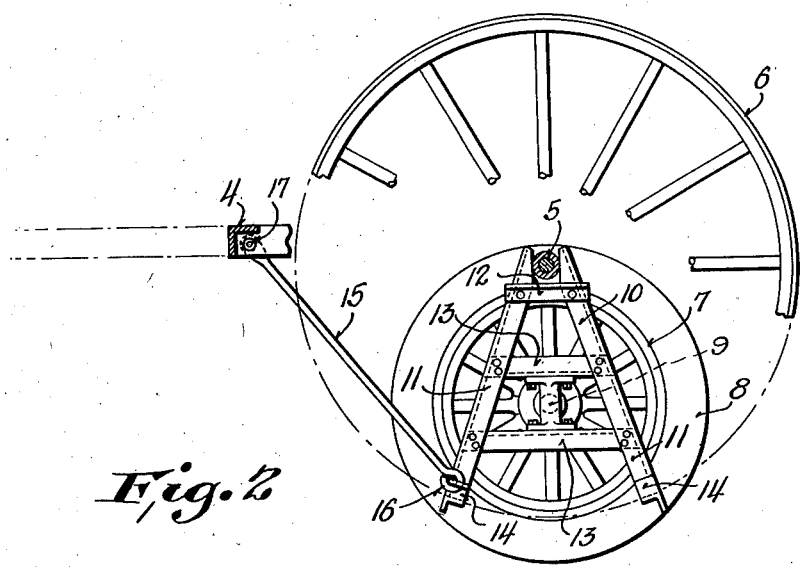
Fig. 2 is a detail sectional view taken on the line 2—2 of Fig. 1, parts being broken away.

In applying the device to a wheel the cradle 10 is placed at about ninety degrees in advance of the position shown in Fig. 2 with the axle 5 positioned in said cradle and the hooked portions 14 against the wheel 6. Then by turning the device with the wheel 6, the said wheel 6 is raised as the cradle swings to its wheel carrying position shown in Fig. 2 and the cradle or frame is prevented from rotating by fastening the tie rod 15 to the frame 4.

With both of the wheels 6 carried by the trailer wheels above described the vehicle 3 may be placed behind a hauling vehicle and rapidly hauled along the highway and the trailer wheels may be readily removed therefrom when the destination is reached.

We desire it to be understood that this invention is not to be limited to any particular form or arrangement of parts except in so far as such limitations are included in the claims.

What we claim as our invention is:

1. In an apparatus of the character described, the combination of a single rubber tired trailer wheel, an axle carrying frame for said wheel having an axle receiving portion substantially vertically alined with the axle for said trailer wheel and a cradle portion below said axle receiving portion for the wheel of the vehicle to be pulled, and means for connecting said frame to the frame of the vehicle to be pulled to prevent rotation of said first named frame.

2. In an apparatus of the character described, the combination of a wheel carrying frame having an axle receiving portion substantially vertically alined with the axle for a trailer wheel and a centrally mounted wheel axle, a rubber tired trailer wheel mounted on said axle, spaced wheel rim engaging portions on said frame below said axle, and means for preventing rotation of said frame relative to the vehicle.

3. In an apparatus of the character described, the combination of a wheel carrying frame having an upper axle receiving slot and spaced wheel engaging portions, an axle on said frame equidistant from and above said wheel engaging portions and alined with said slot, a trailer wheel mounted on said axle and projecting below said wheel supporting portions, said frame with its wheel acting automatically to lift the wheel of the vehicle to be pulled clear of the ground as said vehicle wheel is rotated to bring said frame to a substantially vertical position, and a tie bar for maintaining said frame in its substantially vertical position after said vehicle wheel has been raised connecting said forward end of the frame with the frame of said vehicle.

HERMAN TONN.
WALTER HOLSTEN.